UNITED STATES PATENT OFFICE.

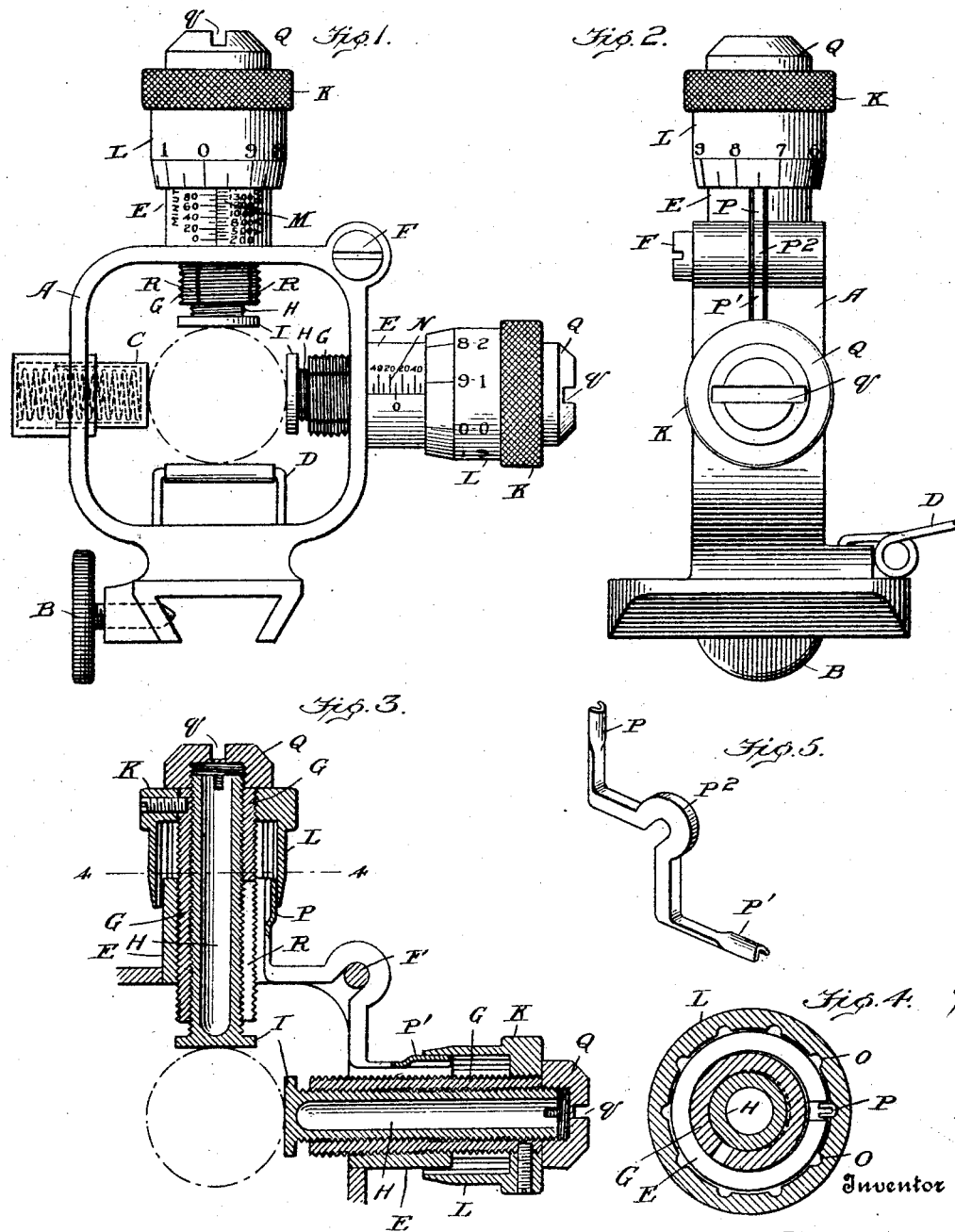

ROBERT V. R. REYNOLDS, OF WASHINGTON, DISTRICT OF COLUMBIA.

MOUNTING FOR TELESCOPE GUN-SIGHTS.

1,386,027. Specification of Letters Patent. Patented Aug. 2, 1921.

Application filed August 2, 1920. Serial No. 400,822.

*To all whom it may concern:*

Be it known that I, ROBERT V. R. REYNOLDS, a citizen of the United States, residing at Washington, in the District of Columbia, have invented certain new and useful Improvements in Mountings for Telescope Gun-Sights; and I do hereby declare the following to be a full, clear, and exact description of the same, reference being had to the accompanying drawings, forming part of this specification.

The present invention relates to mechanism or devices for mounting gun sight telescopes in such wise that the telescope may be accurately and conveniently adjusted both for elevation and to overcome windage. Devices of this kind as heretofore constructed have embodied spring pressed abutments for holding the telescope in contact with adjustable abutments the positions of which are determined by micrometer adjustment with suitable indicating scales whereby the position of adjustment may be determined by observation.

The object of the present invention is to provide an improved adjusting mechanism which will have the capacity not only of having its position determined by observation of the scales, but with which variations in the adjustment may be effected in known increments by noting the feel of the adjusting devices or utilizing the sensation of feeling alone or in connection with the sound made by the indicating instrumentalities while the adjustment is being effected. A further object of the invention is to provide a means whereby the adjustable abutment may be set to zero, or to any desired variation from zero to suit a particular elevation, windage or other ballistical condition, or to overcome variations due to usage, and the parts locked in their new relative set positions while leaving the indicating mechanism in the initial relationship. In this way the line of sight may easily be made to coincide with the point of impact on the target, while the scales read the true windage and range. This permits the use of scales reading points of windage and yards of range in addition to minutes of angle as heretofore. It also permits the use of the same sight on several arms of different caliber or ballistical qualities, reading absolute quantities of elevation on each provided suitable elevation scales are substituted. Another object in connection with this adjustment or setting of the instrument is to provide a setting and locking mechanism which cannot be readily tampered with or misplaced accidentally, but, at the same time, one which with any simple instrumentality at hand may be readily reset should occasion require.

Referring to the accompanying drawings,—

Figure 1 is an elevation of a mounting for telescopes of gun sights embodying the present improvements.

Fig. 2 is an elevation in a plane at right angles to Fig. 1.

Fig. 3 is a partial section through the device, in a plane normal to the point of observation in Fig. 1.

Fig. 4 is a section on the line 4—4 of Fig. 3.

Fig. 5 is a perspective view of the spring members forming a part of the indicating mechanism and showing the preferred construction of the same with a common shank piece.

The member which is adapted to be attached to the gun, and which is preferably in the form of an open frame is indcated at A. It is provided with any suitable means such as a dove-tail clamp and set screw B to effect the said attachment. This frame is as usual provided with spring-pressed abutments, one of which may be in the form of a spring-pressed plunger C and the other in the form of a spring-pressed bail D, as is usual in devices of this kind, but it will be understood that these spring-pressed abutments are conventional and hence any other known form may be substituted without departing from the present invention. Arranged at an angle to each other and preferably in vertical and horizontal lines opposite the spring-pressed abutments are cylindrical projections E which are attached to or formed as a part of the member A, said cylindrical projections E being internally screwthreaded and split at one side preferably in connection with the corner of the member A, whereby a screw F passing through said corner may be employed as a means for contracting the cylindrical projections to thereby clamp the adjustable stems mounted in said projections. This construction is also a known construction and is adopted as a convenient arrangement for illustrating the present invention.

The screw stems G which are threaded in the cylindrical projections E are, in the present instance, themselves made cylindrical and are internally threaded for the reception of externally threaded abutment shanks H, the latter preferably extending through the screw stems G from end to end. At their inner ends the abutment shanks H carry or are formed with abutment heads or surfaces I, while at their outer ends they are provided with means whereby they may be rigidly locked in their adjusted position with relation to the screw stems. The screw stems G carry knurled heads K by which the manual adjustment is effected, and also carry a cylindrical skirt L which extends down around the cylindrical projections E. By providing suitable graduations indicating elevation on the vertical projection and windage on the horizontal projection, as shown at M and N, respectively, and by providing the skirts L with coöperating graduations, effective micrometer adjustments may be made and by observation such adjustments readily determined. Or, the graduations for wind or elevation may wind in a helix around the skirt, and be read by a suitable indicator as in prior devices while relative quantities, preferably minutes of angle, are read from the micrometer.

In order, now, that minor adjustments may be effected without the necessity of ocular observation, which latter under many conditions is exceedingly difficult, provision is made whereby regular recurrent resistance is interposed to the rotation of the adjustable screw stems and these recurrent resistances are made to occur in definite spaced relation to the diameter of the stems and the pitch of the screw threads, preferably coinciding with the graduation to minutes of angle. As a convenient and preferred arrangement, the interior surface of each of the skirts L is provided with a series of straight longitudinal parallel grooves O, best seen in section in Fig. 4, and a spring-pressed member P or P' is mounted in position to coöperate with these grooves in all longitudinal positions of the screw stem. The grooves are preferably spaced equally and divide the cylindrical skirts into ten or more equal parts. The springs P—P' coöperating with the grooves form what is termed a click device which, while it will permit the stem to be rotated in either direction, nevertheless interposes marked periodic differences in the resistance to turning movement accompanied by a slight sound, and the operator will, therefore, know accurately how far in one direction or the other he has turned the screw stem by feeling or hearing the number of clicks. Such a device can be set accurately in the dark, or at arm's length, without inspection.

As a convenient arrangement, and one which commends itself in practice, the spring-pressed members P, P' are preferably formed with a common shank $P^2$ adapted, together with the spring-pressed members themselves, to be mounted in the slot or slit which extends through the corner of the member A and cylindrical projections E, utilizing the clamp screw F as a fulcrum, a sufficient tolerance being allowed to permit of the clamping action hereinbefore referred to when it is desired to lock the adjustable members firmly in position.

To effect the locking between the respective screw stems and the shanks of the adjustable abutments, cap locking nuts Q are preferably employed. These cap locking nuts fit on the outer ends of the said shanks and are preferably provided with slots $q$ adapted to receive a screw driver, a coin or a knife blade or similar instrumentality whereby they may be turned, and the ends of the shanks H are similarly slotted, the latter slots being exposed when the locking nuts are removed.

To enable the adjustment to be effected with certainty and accuracy, the screw stems G are also preferably split or provided with slits R so as to permit of the screw stems being compressed for grasping the shanks H.

With this construction, to effect the adjusting of the instrument, the cylindrical projections and screw stems are contracted by means of the screw F so as to clamp the parts firmly, whereupon the lock nuts Q may be removed, the screw F slightly loosened so as to release the shanks sufficiently, and the latter adjusted to the point desired with relation to the screw stems. Thereupon the screw F is again tightened to clamp the parts in this position and the lock nuts Q are applied and set up tightly. The screw F may then be loosened sufficiently to permit of any desired setting of the sight by scale or micrometer or click, and obviously may be set to exert any desired friction for holding such settings against accidental displacement.

In sight setting, major changes, of course, will be accomplished by observation of the graduations. Such a setting having been once made the operator may then make the minor changes such as a minute of angle, more or less, without further observation of the graduations simply by feeling the action of the click or noting the noise made thereby when the screw stem is turned in one direction or the other.

The arrangement illustrated is one which is eminently practical and satisfactory, but it is obvious that the details of construction may be varied to suit different types of micrometer adjustment without departing from the object of the present invention, and hence it is not desired to limit the invention to such details of construction save where such details are specifically included in the claims.

What is claimed is:

1. A mounting for telescopes of gun sights, comprising a member for attachment to the gun and having an opening adapted to receive the telescope, a radially-disposed manually-operable adjusting screw and coöperating abutment for adjusting the position of the telescope in said member, and an indicator for the screw adjustment comprising a member provided with a circular surface having a series of recesses therein and a spring-pressed member coöperating therewith for varying the resistance to the manual rotation of the screw in either direction.

2. A mounting for telescopes of gun sights comprising a member for attachment to the gun and having an opening adapted to receive the telescope, radially disposed manually operable adjusting screws arranged at an angle to each other and coöperating spring-pressed abutments for adjusting the position of the telescope in said member, and an independent indicator for each screw adjustment comprising a member provided with a circular surface having a series of recesses therein, and a spring-pressed member coöperating therewith for varying the resistance to the manual rotation of the screw in either direction.

3. A mounting for telescopes of gun sights, comprising a member for attachment to the gun and having an opening adapted to receive the telescope, a radially disposed manually operable adjusting screw and coöperating abutment for adjusting the position of the telescope in said member, and an indicator for the screw adjustment comprising a part provided with a cylindrical surface movable in unison with the screw and having a series of recesses therein and a relatively fixed spring-pressed member coöperating therewith for varying the resistance to the manual rotation of the screw in either direction.

4. A mounting for telescopes of gun sights, comprising a member for attachment to the gun and having an opening adapted to receive the telescope, radially-disposed manually-operable adjusting screws arranged at an angle to each other and coöperating spring-pressed abutments for adjusting the position of the telescope in said member, and an independent indicator for each screw adjustment comprising a part provided with circular surface having a series of recesses therein, and a spring-pressed member coöperating therewith for varying the resistance to the manual rotation of the screw in either direction, said spring-pressed member being formed with a common shank and means for securing said shank to the telescope receiving member.

5. A mounting for telescopes of gun sights comprising a member for attachment to the gun and adapted to receive the telescope, an internally threaded split cylindrical projection on said member, a split internally threaded screw stem working in said projection, an externally threaded abutment working in said split screw-stem, a clamping screw for contracting the projection to clamp the screw stem and to thereby contract the latter to clamp the abutment and independent means for locking the threaded stem and abutment together.

6. An adjustable abutment setting mechanism comprising an internally threaded split cylindrical member and clamping screw for contracting said member, a split cylindrical internally threaded screw stem working in said member and having means for indicating its adjustment, an abutment shank threaded in said split stem and having an abutment face at one end and a locking nut on said shank for locking the abutment and stem together, whereby the lock nut may be loosened, the abutment adjusted in the stem and clamped in adjusted position while the lock nut is again tightened.

7. An adjustable abutment setting mechanism, comprising an internally threaded cylindrical member, an internally threaded cylindrical stem working therein and having means to indicate its adjustment, an abutment shank threaded in said stem to project at both ends thereof, an abutment head on one end of said shank, and a locking nut on the opposite end of said shank for holding the abutment and stem fixed in adjusted position with relation to the stem.

ROBERT V. R. REYNOLDS.